Figures 1, 2:
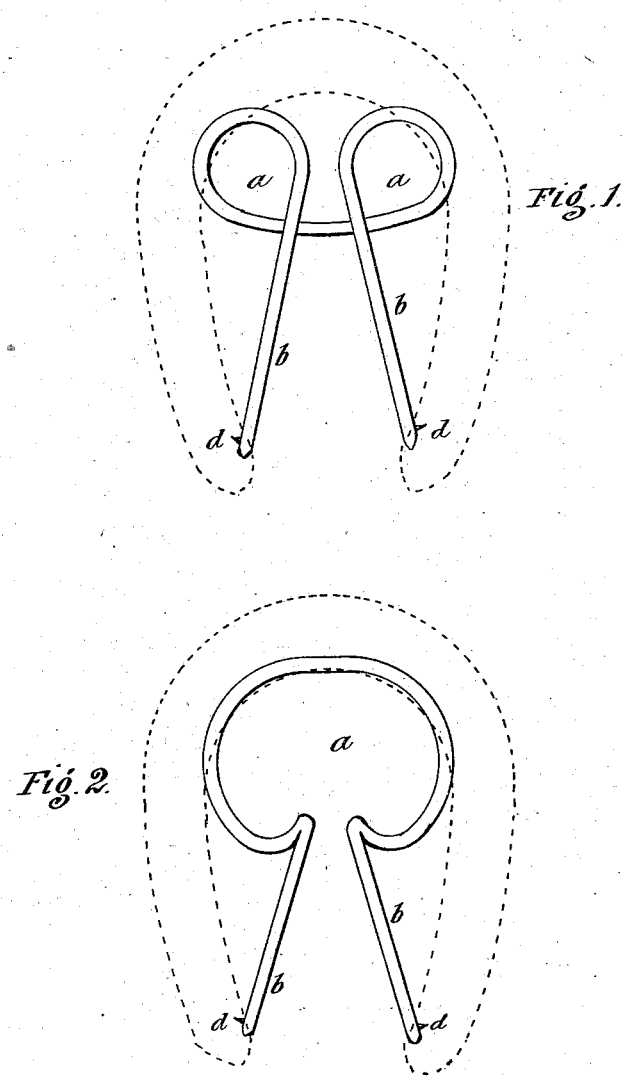

(No Model.)

D. ROBERGE.
Hoof Expander.

No. 239,550.　　　　　Patented March 29, 1881.

WITNESSES:
W. H. Bennett
John F. Dinkel

INVENTOR
David Roberge.
BY
John S. Thornton
ATTORNEY

United States Patent Office.

DAVID ROBERGE, OF NEW YORK, N. Y.

HOOF-EXPANDER.

SPECIFICATION forming part of Letters Patent No. 239,550, dated March 29, 1881.

Application filed February 8, 1881. (No model.)

*To all whom it may concern:*

Be it known that I, DAVID ROBERGE, a citizen of the United States, residing in the city of New York, in the county and State of New York, have invented an Improved Hoof-Expander; and I hereby declare the following to be a full, clear, and exact description thereof, reference being had to the accompanying drawings, which form a part of this specification.

This invention relates to an improvement in hoof-expanders or devices for expanding the hoofs of horses and mules, to prevent or cure contraction of the hoof; and the object of the invention is to provide a hoof-expander of simple construction, which can be easily applied, will fit snugly to the foot, and will exert a constant and unvarying pressure, tending to expand the hoof in a more perfect manner than has heretofore been accomplished.

The invention consists in a hoof-expander made from a single length of spring-wire, or similar material, bent in such a manner that one or more bows or eyes shall be formed thereon, which said bows or eyes serve the double purpose of adapting the expander to lie snugly within the cavity of the foot, and of imparting a very elastic pressure, which will not materially diminish in force as the spring expands.

I am aware that spring hoof-expanders have before been used, as shown in Letters Patent granted to one Charles H. Shepard, and numbered 182,608 and 213,592; but those forms of spring I do not use; and the main object of my invention is to obviate the disadvantages arising from the too great rigidity of the spring, and to produce a more elastic pressure, which will be practically unvarying in its force so long as the expander remains applied to the foot.

In the accompanying drawings, Figure 1 represents a plan view of my improved hoof-expander, and Fig. 2 a modified form thereof.

Similar letters of reference indicate the same parts in both the figures.

The expander is made, as above mentioned, from a single length of spring-wire of suitable thickness, or of other suitable material possessing the necessary degrees of strength and elasticity. This wire is brought substantially into the form shown in the drawings, whereby one or more bows or eyes, *a*, are formed, which are adapted to lie snugly in the cavity of the foot, and which impart an extreme degree of elasticity to the spring, so that it will not exert an undue pressure when first applied, nor vary to any appreciable extent in the degree of pressure it exerts when the spring expands by the expansion of the hoof, but will produce a pressure that is practically unvarying.

The legs *b b* are intended to be inserted into shallow grooves cut in the hoof to receive them, and may be provided with prongs or pins *d d* near their ends, which embed themselves in the hoof and keep the expander in position.

A portion of the foremost end of the spring lies under the sides of the shoe, for the purpose of preventing the expander from becoming displaced, as is shown in the drawings, the dotted lines representing the shoe.

Fig. 1 represents the preferred form, inasmuch as it affords a longer length of spring, and consequently a greater degree of elasticity.

What I claim as my invention is—

A hoof-expander consisting of a single length of spring-wire or other suitable material, having formed thereon one or more bows or eyes, *a*, together with two legs, *b b*, provided with prongs or pins *d*, all as herein shown and described, for the purpose set forth.

DAVID ROBERGE.

Witnesses:
M. H. TOPPING,
JOHN S. THORNTON.